(12) United States Patent
Weigl et al.

(10) Patent No.: US 7,196,842 B2
(45) Date of Patent: Mar. 27, 2007

(54) ATTENUATING FILTER FOR ULTRAVIOLET LIGHT

(75) Inventors: Bernhard Weigl, Steinheim (DE); Hans-Jochen Paul, Aalen (DE); Eric Eva, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 0 days.

(21) Appl. No.: 10/998,050

(22) Filed: Nov. 29, 2004

(65) Prior Publication Data

US 2005/0179996 A1 Aug. 18, 2005

Related U.S. Application Data

(63) Continuation of application No. 10/151,892, filed on May 22, 2002, now abandoned.

(30) Foreign Application Priority Data

May 22, 2001 (DE) ................. 101 27 225

(51) Int. Cl.
*F21V 9/06* (2006.01)
*G02B 5/20* (2006.01)

(52) U.S. Cl. .................. 359/361; 359/350; 359/358; 359/359; 359/360

(58) Field of Classification Search ................ 359/350, 359/358, 359–361
See application file for complete search history.

(56) References Cited

U.S. PATENT DOCUMENTS

| 2,675,740 | A |  | 4/1954  | Barkley |
|---|---|---|---|---|
| 4,372,987 | A |  | 2/1983  | Ganner et al. |
| 4,975,328 | A |  | 12/1990 | Hirose |
| 5,144,498 | A | * | 9/1992  | Vincent ............ 359/885 |
| 5,181,141 | A |  | 1/1993  | Sato et al. |
| 5,201,926 | A |  | 4/1993  | Szczyrbowski et al. |
| 5,275,916 | A |  | 1/1994  | Kato |
| 5,380,558 | A |  | 1/1995  | Fujino |
| 5,493,442 | A |  | 2/1996  | Buchholz et al. |
| 5,591,529 | A |  | 1/1997  | Braatz et al. |
| 5,694,240 | A |  | 12/1997 | Sternbergh |
| 6,387,517 | B1 |  | 5/2002  | Belleville et al. |

(Continued)

FOREIGN PATENT DOCUMENTS

DE          975 553           1/1962

(Continued)

*Primary Examiner*—Drew A. Dunn
*Assistant Examiner*—Joshua L. Pritchett
(74) *Attorney, Agent, or Firm*—Sughrue Mion, PLLC

(57) ABSTRACT

An attenuating filter provides a prescribed attenuation of the intensity of transmitted, short-wavelength, ultraviolet light, in particular, at wavelengths below 200 nm, that is governed by a predefinable spatial distribution of its spectral transmittance. The filter has a transparent substrate (3), e.g. fabricated from crystalline calcium fluoride. A filter coating (5) fabricated from a dielectric material that absorbs over a predefined wavelength range is applied to at least one surface (4) of the substrate. In the case of operating wavelengths of about 193 nm, the filter coating consists largely of tantalum pentoxide. Filters of the type, which may be inexpensively fabricated with high yields, are noted for their high abilities to withstand laser radiation and may be effectively antireflection coated employing simply designed antireflection coatings.

33 Claims, 3 Drawing Sheets

U.S. PATENT DOCUMENTS

| | | |
|---|---|---|
| 6,574,039 B1 | 6/2003 | Murata et al. |
| 2001/0008540 A1* | 7/2001 | Oba et al. .................. 372/101 |
| 2002/0176183 A1 | 11/2002 | Erz et al. |

FOREIGN PATENT DOCUMENTS

| | | |
|---|---|---|
| DE | 1 157 002 | 11/1963 |
| DE | 3832111 A1 | 4/1989 |
| DE | 42 10 079 A1 | 10/1992 |
| DE | 44 10 275 A1 | 10/1994 |
| GB | 1178707 | 1/1970 |
| GB | 2 161 953 A | 1/1986 |
| JP | 63-243726 | 10/1988 |
| JP | 07020312 * | 1/1995 |
| JP | 07020312 A | 1/1995 |

* cited by examiner

ATTENUATING FILTER FOR ULTRAVIOLET LIGHT

This is a continuation of parent application Ser. No. 10/151,892 filed on May 22, 2002 now abandoned, and incorporated herein by reference in its entirety. This application is also based on German Patent Application No. DE 101 27 225.1 filed on May 22, 2001, to which priority is claimed and which is incorporated herein by reference in its entirety.

BACKGROUND OF THE INVENTION

1. Field of the Invention

The invention relates to an attenuating filter providing a prescribed attenuation of the intensity of transmitted ultraviolet light over a predefined wavelength range according to a predefinable spatial distribution of its spectral transmittance.

2. Description of the Related Art

Attenuating filters of the type usually have a plane-parallel substrate fabricated from a material that has a sufficiently high transmittance for ultraviolet light over the wavelength range to be involved, as well as at least one filter coating that provides the desired spatial distribution of spectral transmittance applied to a surface of the substrate. Attenuating filters of the type are employed for, e.g., maintaining constant irradiation levels during long-term endurance tests employing laser light in order to quantitatively assess the abilities of certain samples, such as various types of quartz glass, to withstand irradiation by laser light. Attenuating filters may also be employed for effecting controlled reductions of irradiation levels to defined levels for irradiating samples, conducting calorimetric absorption measurements, or for implementing other methods for reducing or controlling irradiation levels.

One application where accurate maintenance of a prescribed distribution of spatially varying spectral transmittance is of particular importance is the microlithographic fabrication of semiconductor devices or other microelectronic devices. As is well-known, such applications involve the employment of wafer steppers or wafer scanners that, among other things, require minimizing departures from uniform-intensity illumination over the image plane of a projection lens, where specified departures as low as ±2% are commonplace. However, the specified departures are frequently not directly attained in the case of given illumination systems and given projection lenses. In order to eliminate departures from uniform-intensity illumination exceeding tolerable levels, an additional attenuating filter that has a suitably shaped spatial-transmittance profile that will compensate for any variations in irradiation intensity and, preferably, a low reflectance, is inserted into the optical train, immediately ahead of the object plane (reticle plane) of the illumination system involved.

In the case of the aforementioned applications, the optical properties of the filters employed should remain unchanged and the filters should exhibit no noticeable degradation over their service lives. Compliance with this requirement will become increasingly difficult as the wavelengths involved become shorter and the irradiation intensities involved increase. For example, in the case of the latter transmission filters for compensating for variations in irradiation intensity, platinum is employed as the absorbing material of the filter coating on microlithographic projection illumination systems designed for use at wavelengths of 436 nm, 365 nm, and 248 nm. However, platinum exhibits intolerably high degradation at, e.g., wavelengths of 193 nm and shorter wavelengths. In the case of the aforementioned long-term endurance tests wavelengths conducted at wavelengths of 248 nm and shorter wavelengths, solid neutral-density filters having, e.g., absorbing aluminum films like those employed for attenuating light in conjunction with rapidly concluded beam-profile measurements, are employed. However, aluminum films are unsuitable for long-term use, since they oxidize within a few minutes.

Known, multilayer dichroic filters consisting of dielectric-film stacks that have been dimensioned such that the laser wavelength involved lies exactly at their "cut-on" wavelength are employed for longer-duration irradiation-resistance tests. Altering the angle of incidence on same by tilting their substrate relative to the laser-beam axis will lengthen the effective path length for radiation transiting their multilayer dielectric-film stack, which will, in turn, allow altering their spectral transmittance in a controlled manner. However, one disadvantage of that approach is that the spectral transmittance of such filters is extremely sensitive to even the slightest variations in the properties of their multilayer stacks due to the steep gradient in their spectral transmittance in the vicinity of their "cut-on" wavelength. For example, localized de-tuning of their multilayer stacks, such as drifting of their "cut-on" wavelength due to temperature variations, absorption of water by their dielectric films, or accumulations of contamination thereon, may occur after certain periods of irradiation, causing a beam profile to become burned into them, making them unsuitable for further use as spatially homogeneous attenuating filters. Multilayer dielectric filters of the type whose filtering effects are adjusted by tilting them are unsuitable for use as transmission filters to be installed in the vicinities of the reticle planes of projection illumination systems.

SUMMARY OF THE INVENTION

One object of the invention is to provide an attenuating filter for ultraviolet light with wavelengths shorter than 200 nm that is capable of withstanding continuous-duty laser irradiation. It is another object that the attenuating filter should be both simple and inexpensive to fabricate and capable of being antireflection coated, if necessary.

As a solution to these and other objects, the invention, according to one formulation, provides an attenuating filter providing a prescribed attenuation of the intensity of transmitted ultraviolet light over a predefined wavelength range according to a predefinable spatial distribution of a spectral transmittance, the attenuating filter including:

a substrate fabricated from a transparent material; and at least one filter coating applied to a surface of the substrate;

the filter coating including at least one layer fabricated from a dielectric material that absorbs over a predefined wavelength range. This allows a variation of the transmittance of the filter coating to be obtained by varying the thickness of the dielectric layer.

Beneficial other embodiments are stated in the associated dependent claims. The wording appearing in all of the claims is herewith made a part of the contents of this description.

An attenuating filter in the sense of the invention that is of that type mentioned at the outset hereof is characterized in that its filter coating consists of at least one layer of a dielectric material that absorbs over that predefined wavelength range to be involved, whereby a major share of its filtering effect will be due to absorption of radiation within the filter coating. The absorbing dielectric material is to be chosen such that it has an effective cross-section at the prescribed operating wavelength that is large enough to ensure that a rapid variation in the transmittance of the layer of dielectric material may be obtained by varying its thickness, if desired. On the other hand, any reductions in its transmittance due to reflection losses will be either low or negligible, which will be particularly highly beneficial in the case of applications that require avoiding stray light and/or employment of filters with high total transmittances. A uniform attenuating effect over the entire filter surface may be obtained if a uniform thickness of the filter coating is applied.

In order to allow exercising the degrees of control over film thicknesses or variations in film thicknesses during processing needed for achieving the desired transmittance characteristics, it has been found that it may be beneficial if the dielectric material has an absorption coefficient, k, in excess of 0.5, where an absorption coefficient of k>1.0 is preferable.

In view of the desired high ability to withstand laser irradiation, preferred embodiments of the invention provide that the dielectric material employed for fabricating the filter coating will either contain a metal oxide or largely consist of a metal oxide. In the case of laser wavelengths of about 193 nm, filter coatings based on tantalum pentoxide ($Ta_2O_5$) have proven particularly beneficial. If necessary, hafnium oxide ($HfO_2$) may be employed as a coating material. In the case of shorter laser wavelengths, e.g., wavelengths of about 157 nm, aluminum oxide ($Al_2O_3$) may also be suitable. Admixtures of several dielectrical materials may also be employed.

Employment of tantalum oxide or tantalum pentoxide for fabricating optical filters, particularly interference filters, is, as such, known. However, tantalum oxide, whether alone or admixed with other materials, has thus far largely been employed for fabricating antireflection coatings for the visible spectral region (cf., e.g., German Pat. Nos. DE 690 21 420 C2 or DE 30 09 533 C2). Tantalum oxide is also frequently employed for fabricating coatings that have high transmittances in the visible and high reflectances in the infrared (cf., e.g., German Pat. Nos. DE 38 25 671 and DE 692 08 712). However, in such applications, the absorption of tantalum oxide is negligible.

Employing a highly absorbing dielectric material, such as tantalum pentoxide, for the filter coating allows covering the entire range of spectral transmittances, from nearly 100% transmittance (in the case of low coating thicknesses or sections of substrates lacking filter coatings) to high attenuations of incident radiation ranging down to around 1%, or several percent, of incident intensities, over the entire spectral range in question using maximum film thicknesses of around 10 nm, 5 nm, or less.

Filter coatings with low thicknesses of, e.g., around 1 nm to 2 nm, have another advantage in that they may be effectively antireflection coated employing simply configured antireflection coatings. In particular, uniform antireflection coatings, i.e., antireflection coatings that have virtually constant, low, reflectances over the entire coated surfaces of filters to which they are applied, may be realized employing antireflection coatings with largely uniform thicknesses, since localized thickness gradients in the absorbing coatings involved will usually be so slight that they will have negligible effects on the local angles of incidence on the coated surfaces. The angles of incidence will thus roughly equal the angles of incidence on the substrates involved, which will usually be less than 20°. The angles of incidence on the coated surfaces and the substrates will thus be largely identical, even if the materials from which the respective filter coatings involved are fabricated have relatively low absorption coefficients, k. Effective antireflection coating thus need not be either broadband or effective over widely varying angles of incidence. The preferred, thin, filter coatings, may thus be effectively antireflection coated employing relatively simply configured antireflection coatings.

Dielectric antireflection coatings preferably have either a single layer or a single stack consisting of alternating layers of a dielectric material with a high refractive index and a dielectric material with a low refractive index.

Several embodiments of the invention foresee application of an antireflection coating to that face of the substrate of the attenuating filter opposite that to which the filter coating is applied, where the antireflection coating may be either a single-layer or a multilayer coating. The resultant virtual elimination of reflection losses at both the entrance and exit faces of the attenuating filter will allow achieving the best possible (total) reductions of reflection losses, which will be of particular importance in the case of those attenuating filters for controlling illumination levels in the image planes of projection lenses mentioned at the outset hereof, since high illumination levels will allow achieving high wafer through puts and thus cost-effective fabrication of semiconductor devices.

The preceding and other properties may be seen both in the claims and in the description and the drawings, wherein the individual characteristics involved may be used either alone or in sub-combinations as an embodiment of the invention and in other areas, and may individually represent advantageous and patentable embodiments.

DETAILED DESCRIPTION OF THE INVENTION

Figure 1:
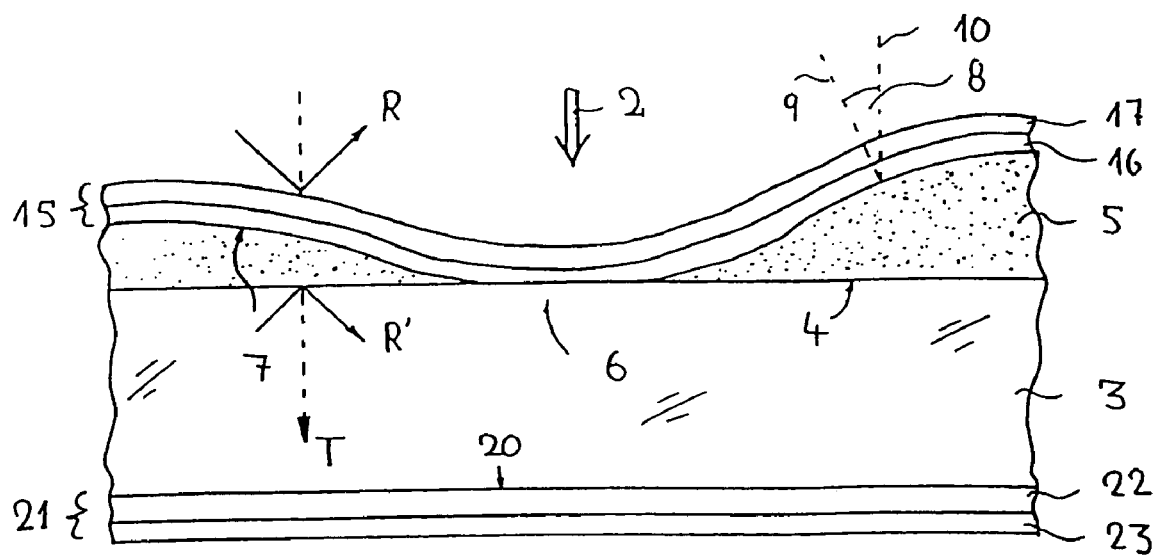
FIG. 1 is a section through part of a sample embodiment of an attenuating filter according to the invention, together with an associated plot of the relative transmittance of the attenuating filter as a function of location on same.
Figure 1:
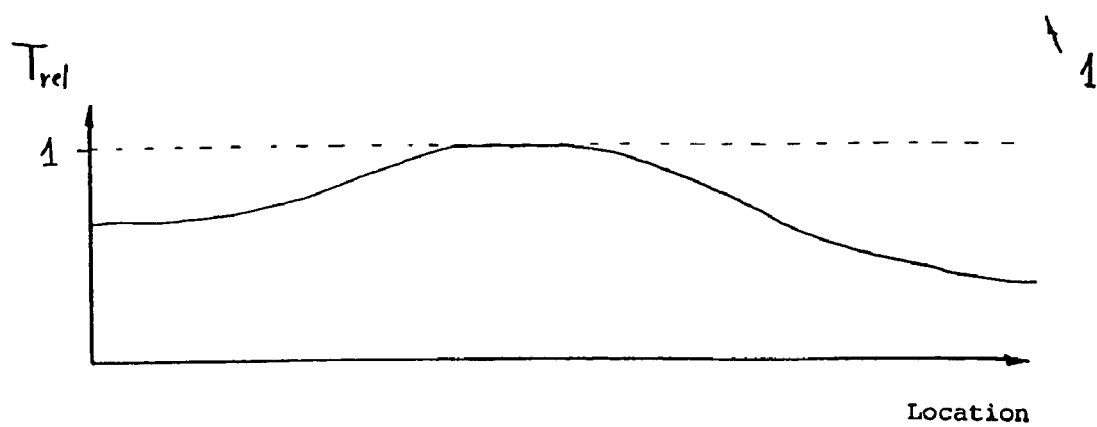

The upper illustration of FIG. 1 depicts a schematized vertical section through a sample embodiment of an attenuating filter 1 according to the invention. The attenuating filter yields prescribed attenuations of ultraviolet light 2 conforming to a predefinable spatial distribution of the former's transmittance and has been designed for use at an operating wavelength of 193 nm. The attenuating filter has a substrate 3 in the form of a thin, plane-parallel plate fabricated from a material, e.g., crystalline calcium fluoride or quartz, that has virtually no absorption at the operating wavelength. Evaporated onto the planar entrance face 4 of the substrate is an absorbing filter coating 5 in the form of a gradient-filter coating whose local thickness varies continuously over the entrance face, where the thickness of the coating may drop to zero, thereby yielding, as in the case of the example depicted here, zones 6 that are not covered by the coating. The spatial distribution of the thickness of the filter coating or its transmittance might differ from that schematically indicated in the drawing, e.g., either might be concentrically distributed.

The filter coating, which has a maximum thickness of less than 2 nm, is so thin that its front surface 7 will be only slightly tilted with respect to the incident ultraviolet light 2, even in the vicinities of thickness gradients. The maximum angle of incidence for light incident on the filter coating 5, i.e., the angle 8 between the local normal 9 to its front surface 7 and the beam axis 10 of the ultraviolet light 2, will typically be roughly equal to the latter's angle of incidence on the entrance face 4 of the substrate, i.e., will usually be less than 10° to 20°.

The filter coating 5 essentially consists of a layer of an absorbing dielectric material that is resistant to ultraviolet light, which, in the case of the sample embodiment shown here, has been fabricated from tantalum pentoxide ($Ta_2O_5$), which has been found to have extremely high long-term stability at wavelengths in the vicinity of the operating wavelength, in the case of the preferred types of coatings, may be readily deposited employing physical vapor deposition (PVD), and has highly favorable optical properties for the application considered here. In addition to its rather high refractive index, 1.95, compared to the substrate material, calcium fluoride, which has a refractive index of 1.55, this particular metal oxide also has a high absorption coefficient, k, of 1.16, at the operating wavelength, i.e., has a high absorption cross-section for the ultraviolet light 2 employed, which means that any desired transmittance, from maximum transmittance at those zones 6 that have no filter coating to partial or complete blocking of the incident ultraviolet light 2, may be obtained by suitably varying the thickness of the filter coating 5. However, in the case of the application considered here, only relatively minor local variations in relative transmittance (the ratio of the filter coating's local transmittance to its total transmittance) of a few percent are involved. For example, reducing the coating's thickness from about 1.5 nm to zero will be sufficient to increase its relative transmittance from about 0.87 to 1.00.

A particular advantage of attenuating filters according to the invention is that the filter coating 5 may be particularly easily uniformly antireflection coated, i.e., coated with an antireflection coating whose reflectance is uniform over its entire surface area, due to its low thickness. Antireflection coating attenuating filters is usually required in order to avoid stray light and reflection losses, which, in the case of the compensating filter mentioned at the outset hereof, will be necessary in order to minimize departures from uniform illumination of the image planes of microlithographic projection illumination systems, where filters with predefinable transmittance profiles, combined with low reflectances, are required in order to avoid stray light and global reflection losses, either of which would slow down illumination processes.

A duolayer, dielectric, antireflection coating 15 that has also been applied by means of vacuum evaporation has been employed for antireflection coating the front surface 7 of the filter coating 5. The antireflection coating 15 consists of a single layer 16 of a dielectric material with a high refractive index applied to the filter coating 5 and a single layer 17 of a dielectric material with a low, relative to the material with a high refractive index, refractive index applied on top of the layer 16 of a dielectric material with a high refractive index. In the case of the sample embodiment depicted here, the dielectric material with a high refractive index is aluminum oxide ($Al_2O_3$), which has a refractive index of 1.69, and the dielectric material with a low refractive index is magnesium fluoride ($MgF_2$), which has a refractive index of 1.4. The layers 16, 17 of the antireflection coating 15 have virtually constant thicknesses of approximately 60 nm, in the case of $Al_2O_3$, and approximately 32 nm, in the case of $MgF_2$, over the entire front surface 7 of the filter coating 5 and are thus particularly simply applied to roughly planar substrates. In addition to their antireflection properties, such antireflection coatings may also serve as protective coatings protecting their very thin, underlying, filter coating 5 against the effects of adverse ambient conditions. In spite of the rather simple design of the antireflection coating 15 as a multilayer coating consisting of just two layers 16, 17 and the resultant narrow range of tolerated angles of incidence, it will still provide uniformly high reductions of reflection losses and improved transmittances over the entire entrance face of the attenuating filter, since the angles of incidence 8 involved will remain small over the entire front surface 7 of the filter coating 5 due to its extremely low thickness and the resultant low thickness gradients occurring on its front surface 7.

It would also be possible to provide a multilayer antireflection coating having more than two layers whose respective thicknesses were independently optimized at every location on the filter coating 5, i.e., independently optimized for every local thickness of the filter coating. However, in the most general case, that would yield multilayer antireflection coatings whose individual layers will have locally varying thicknesses, where each of the individual layers would also, in general, have a different spatial thickness distribution, which, in turn, would mean that, in addition to computing the local thickness variations of the absorbing filter coating, a number of local thickness variations equal to the total number of individual layers to be involved would also have to be computed and each of the individual layers then deposited on the filter coating. Fabricating such complex antireflection coatings is extremely difficult. However, the aforementioned duolayer antireflection coatings consisting of layers with uniform thicknesses are comparatively easy to fabricate.

When applied to the front surface 7 of the filter coating, those antireflection coatings discussed above effectively only reduce reflections from the front surface, which has a reflectance R, as indicated in FIG. 1. Applying suitable single-layer or multilayer coatings between the substrate 3 and the filter coating 5 will also allow sufficiently reducing reflections from the interface between the filter coating and the substrate, which has a reflectance, R', as indicated in FIG. 1.

In order to further improve the transmittance of the attenuating filter uniformly over its entire surface area, a duolayer antireflection coating 21 that may also be deleted in the case of embodiments other than that depicted in FIG. 1, has been evaporated onto the rear surface 20 of the substrate 3. The antireflection coating 21 has essentially the same design as the aforementioned antireflection coating 15, which consists of an inner layer 22 of aluminum oxide applied to the substrate and an outer layer 23 of magnesium fluoride. The antireflection coating 21 may also have more than two layers.

In the following, we shall present both comparisons of various dielectric materials that are highly suitable for fabricating the filter coatings and comparisons of antireflection-coated filter coatings and filter coatings lacking antireflection coatings, based on sample embodiments of attenuating filters having concentric spatial transmittance distributions. All values of transmittances, T, reflectances, R, and layer thicknesses, d, stated below have been computed for the case of an operating wavelength of 193 nm, where normal incidence, i.e., an angle of incidence of 0°, has been assumed and the effects of the second (rear) surface of the substrate 3, which has not been provided with an absorbing coating, have been neglected. It has also been assumed that the substrate is fabricated from quartz glass that has a refractive index, n, of 1.55 and a vanishingly small absorption coefficient at the operating wavelength.

FIG. 1 depicts the relative transmittance, $T_{rel}$, (indicated by the solid line) and the associated absolute transmittance, $T_{abs}$, (indicated by the dotted line) for a filter coating having a prescribed, concentric, spatial transmittance distribution and no antireflection coating, where the absolute transmittance is the product of the relative transmittance and the transmittance of the (uncoated) substrate (0.9535). In the case of the particular example show here, the maximum differential transmittance, i.e., the difference between the maximum transmittance and the minimum transmittance, which is about 40%, is relatively high. The "neutral-density filters" of optical systems employed for microlithographic chip fabrication usually have much lower differential transmittances, e.g., 15% or less, which will allow employing even better "simple" antireflection coatings than those to be discussed in conjunction with the examples presented here.

Figure 3:
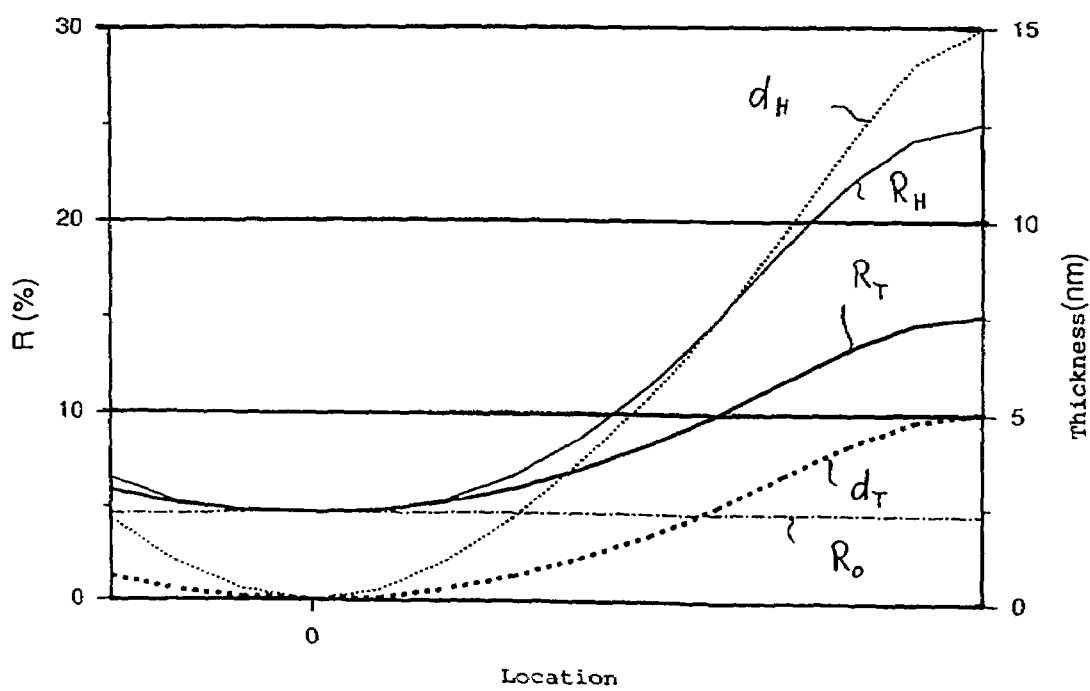
FIG. 3 is a plot comparing the local thicknesses, $d_T$, of a filter coating fabricated from tantalum pentoxide ($Ta_2O_5$) to the local thicknesses, $d_H$, of a filter coating fabricated from hafnium oxide ($HfO_2$) required to yield those local transmittances shown in FIG. 2, along with plots of the associated respective local front-surface reflectances, $R_T$ and $R_H$, of tantalum-pentoxide and hafnium-oxide filter coatings having no antireflection coatings.
Figure 4:
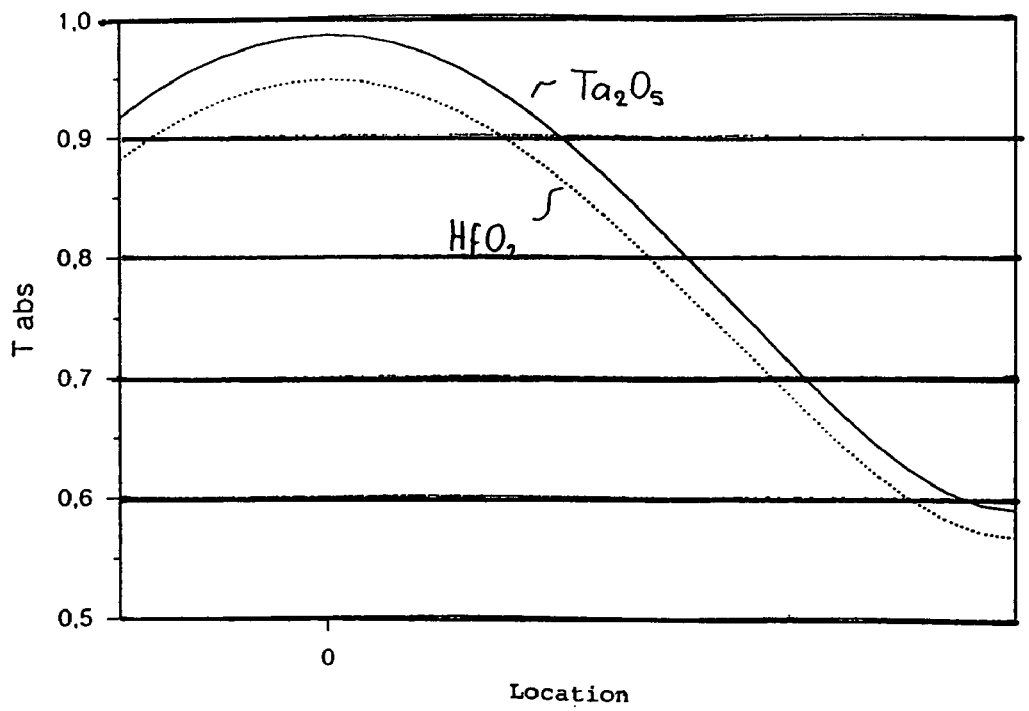
FIG. 4 shows plots of the computed absolute-transmittance, Tabs, for filter coatings fabricated from tantalum pentoxide and hafnium dioxide having antireflection coatings with uniform total thicknesses.
Figure 5:
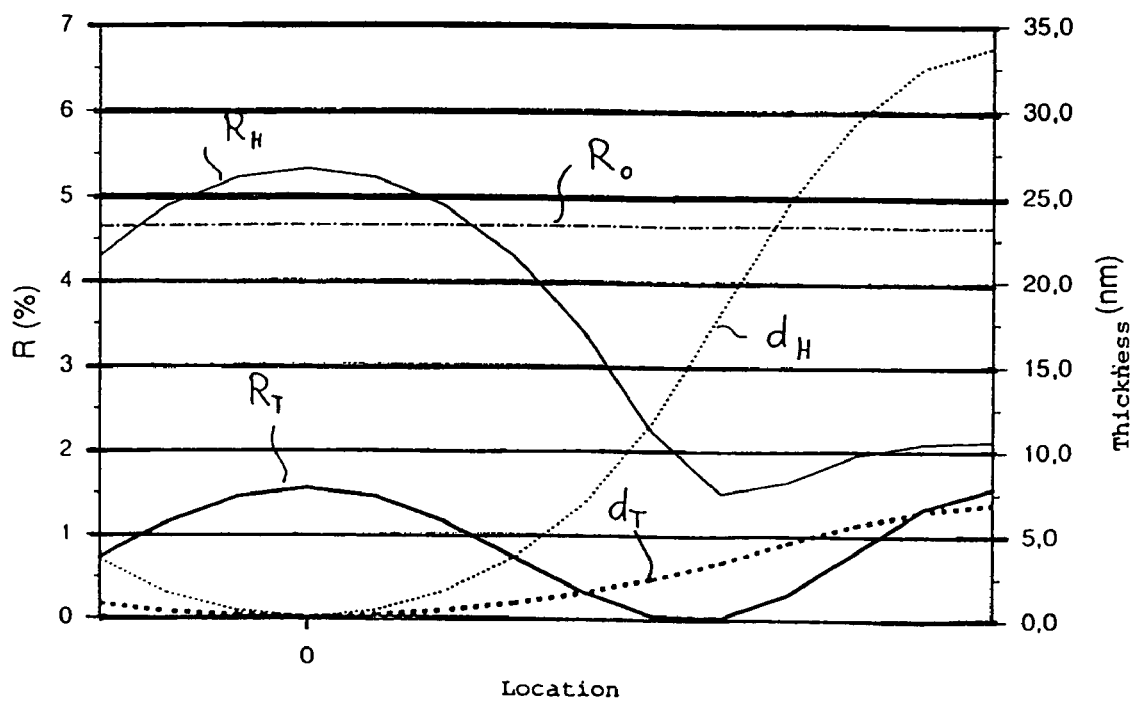
FIG. 5 is a plot of the local thicknesses and reflectances of filter coatings fabricated from tantalum pentoxide and hafnium oxide like that shown in FIG. 3, wherein both of the filter coatings have an optimized antireflection coating with a uniform thickness.

FIGS. 3–5 present comparisons of the optical properties of attenuating filters whose filter coating consists of, in one case, tantalum pentoxide (subscript "T") and, in the other case, of hafnium oxide (subscript "H"). A real refractive index, n, of 1.95 and an absorption coefficient, k, of 1.16 have been assumed for tantalum pentoxide and a real refractive, n, of 2.3 and a much lower absorption coefficient, k, of 0.25 have been assumed for the higher-refractive-index material involved, hafnium oxide. The comparisons indicate that "simple" antireflection coatings whose individual layers have uniform thicknesses will be much simpler to fabricate and much more effective in the case of strongly absorbing filter coatings (tantalum-pentoxide filter coatings) than will be the case if hafnium oxide, which also may be employed at 193 nm, is employed for fabricating the filter coatings.

Figure 2:
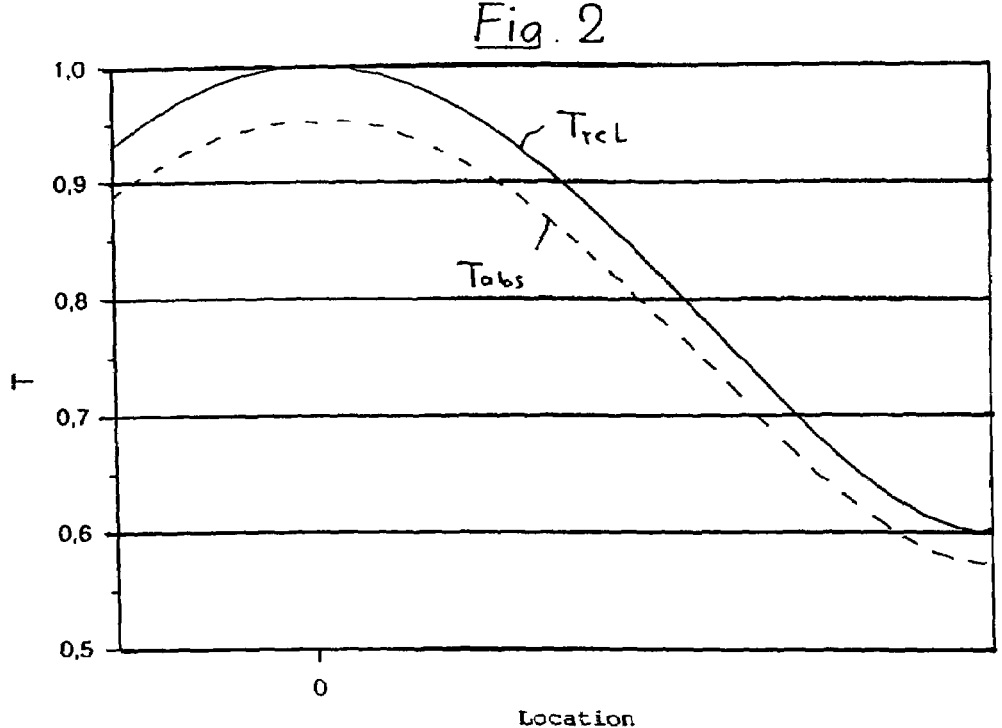
FIG. 2 is a plot of the relative transmittance, $T_{rel}$, and absolute transmittance, $T_{abs}$, as a function of radial location of a sample embodiment of an attenuating filter according to the invention having a concentric spatial transmittance distribution.

FIG. 3 depicts plots of those coating thicknesses, $d_T$ and $d_H$, required to yield the spatial transmittance distributions depicted in FIG. 2 and the resultant front-surface reflectances, $R_T$ and $R_H$, for filter coatings fabricated from tantalum pentoxide and hafnium oxide, respectively. It should be immediately obvious that, in the case of the more strongly absorbing tantalum pentoxide, thinner coatings will be sufficient to allow achieving comparatively larger reflectance reductions.

FIG. 4 depicts plots of those absolute-transmission distributions required to yield those spatial transmittance distributions depicted in FIG. 2 for the case of a tantalum-pentoxide dielectric filter coating (indicated by the solid line) and the case of a hafnium-oxide dielectric filter coating (indicated by the dotted line), to each of which a "simple" antireflection coating, i.e., a duolayer antireflection coating that has a uniform total thickness and whose individual layers have uniform thicknesses, has been applied. In both cases, the antireflection coatings have been optimized to eliminate stray light, i.e., have been designed to yield spatially uniform, low reflectances. It may be seen that better transmittances will be achieved over the entire thickness range involved if tantalum pentoxide, rather than hafnium oxide, is employed for fabricating the filter coating. In particular, employing the latter material will cause high reflection losses, since the performance of the optimized antireflection coating will be degraded at locations where the thickness of the dielectric filter coating drops to zero.

As in FIG. 3, FIG. 5 depicts plots of the coating thicknesses and the resultant reflectances that may be achieved for a tantalum-pentoxide filter coating and a hafnium-oxide filter coating, respectively. However, contrary to the case of FIG. 3, the filter coatings have a "simple" antireflection coating, i.e., a duolayer antireflection coating that has a uniform total thickness, applied to their front surfaces. A comparison of FIG. 3 and FIG. 5 shows, firstly, that those thicknesses, $d_T$ and $d_H$, of tantalum pentoxide and hafnium oxide, respectively, required to yield identical spatial transmittance distributions will be much greater for antireflection-coated filter coatings than for filter coatings that lack antireflection coatings cf. FIG. 3, which may be explained by pointing out that applying antireflection coatings to absorbing coatings markedly increases their transmittance, which must be compensated for by increasing the thickness of the absorbing coatings involved in order to restore their prescribed net transmittance. It may also be seen that, for moderate thicknesses of the antireflection-coated tantalum-pentoxide filter coating ranging from 0 to 7 nm, its reflectance ($R_T$) may be maintained at levels well below 2% over the full extent of the thickness range and may be reduced to virtually zero if its thickness is about 3 nm. On the other hand, low reflectances of around 2% will also be achievable for in the case of hafnium-oxide filter coatings, particularly if their thickness is about 10 nm or more. In the case of low coating thicknesses, the reflectances ($R_H$) of antireflection-coated hafnium oxide filter coatings may even exceed the reflectances ($R_0$) of the uncoated sides of their substrates. In both case, the antireflection coatings involved consist of alternating layers of magnesium fluoride and aluminum oxide having thicknesses of about 30 nm and about 60 nm, respectively, in the case of that tantalumoxide filter coating involved here and about 51 nm and about 36 nm, respectively, in the case of that hafnium-oxide filter coating involved here.

The above comparison indicates that although hafnium oxide is generally suitable for use as the absorbing dielectric material of the filter coating 5 for use at 193 nm, dielectric materials with larger absorption coefficients, k, such as tantalum pentoxide, for which k=1.16, will be a much better choice, since much thinner coatings may be employed and the resultant thinner filter coatings may be highly effectively antireflection coating employing "simple" types of antireflection coatings.

Although the invention has been described here in terms of sample embodiments thereof, numerous variations thereon that are in accordance with the invention are possible. For example, the prescribed spatial distribution of transmittance might be created by providing that the filter coating 5 be configured in the form of a grid of optically dense, e.g., circular, coated zones whose diameters and/or separations have been dimensioned such that they yield the desired transmittance for that zone for every such zone on the surface of the filter, i.e., by configuring a digital filter, rather than by the preferred tailoring of the, continuously varying, thickness of the filter coating. The substrate 3 may be fabricated from any suitable material that is sufficiently transparent at the operating wavelength to be involved. In the case of operating wavelengths of about 193 nm, magnesium fluoride or synthetic quartz glass might also be employed instead of calcium fluoride. At shorter wavelengths, e.g., wavelengths of about 157 nm, calcium fluoride or magnesium fluoride, and, if indicated, barium fluoride, might also be employed as the substrate material. Any absorbing dielectric material that has sufficiently high absorption at the operating wavelength to be involved, which implies that its absorption coefficient, k, should be ideally be greater than 1.0 in order to allow reaching the prescribed attenuations of incident light while employing relatively low coating thicknesses, may be employed for fabricating the filter coating 5. For example, for an operating wavelength of 157 nm, aluminum oxide may be employed for fabricating the filter coating.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all changes and modifications as fall within the spirit and scope of the invention, as defined by the appended claims, and equivalents thereof.

What is claimed is:

1. An attenuating filter comprising:
   a substrate fabricated from a material which is transparent to ultraviolet light; and
   at least one filter coating applied to a surface of the substrate;
   the filter coating comprising at least one layer fabricated from an absorbing dielectric material that absorbs over a predefined wavelength range;
   wherein the thickness, measured perpendicular to the surface of the substrate, of the layer of absorbing dielectric material of the filter coating varies smoothly over the surface of the attenuating filter, wherein the variation in the thickness of the layer of absorbing dielectric material causes a spatial variation of the transmittance of the filter coating across the surface of the attenuating filter, and thereby provides a prescribed attenuation of the intensity of transmitted ultraviolet light over a predefined wavelength range according to a predefined spatial distribution of spectral transmittance;
   and wherein the filter coating has a maximum thickness of less than 10 nm.

2. An attenuating filter according to claim 1, wherein the dielectric material from which the filter coating is fabricated has an absorption coefficient, k, that is greater than 0.5.

3. An attenuating filter according to claim 1, wherein the dielectric material from which the layer of the filter coating is fabricated contains at least one metal oxide.

4. An attenuating filter according to claim 1, wherein the dielectric material contains tantalum oxide.

5. An attenuating filter according to claim 4, wherein the dielectric material consists essentially of tantalum oxide.

6. An attenuating filter according to claim 1, wherein the filter coating has a maximum thickness of less than 2 nm.

7. An attenuating filter according to claim 1, wherein a dielectric antireflection coating is arranged on the filter coating.

8. An attenuating filter according to claim 7, wherein the antireflection coating has an essentially uniform thickness over the entire surface of the filter.

9. An attenuating filter according to claim 7, wherein the antireflection coating has a plurality of layers, each of which has an essentially uniform thickness.

10. An attenuating filter according to claim 7, wherein the antireflection coating has a multilayer stack fabricated from alternating layers of a dielectric material with a high refractive index and layers of a dielectric material with a low refractive index.

11. An attenuating filter according to claim 10, wherein one of the layers of the dielectric material with a high refractive index is applied directly to the filter coating.

12. An attenuating filter according to claim 11, wherein magnesium fluoride ($MgF_2$) is employed as the dielectric material with a low refractive index.

13. An attenuating filter according to claim 11, wherein aluminum oxide ($Al_2O_3$) is employed as the dielectric material with a high refractive index.

14. An attenuating filter according to claim 1, wherein an antireflection coating is applied to the surface of the substrate opposite to that surface on which the filter coating is applied.

15. An attenuating filter according to claim 1, wherein an antireflection coating is arranged between the substrate and the filter coating.

16. An attenuating filter according to claim 1, wherein the filter is designed for use in the ultraviolet spectral region at wavelengths of less than about 200 nm.

17. An attenuating filter according to claim 16, wherein the filter is designed for use at wavelengths of about 193 nm.

18. An attenuating filter providing a prescribed attenuation of the intensity of transmitted ultraviolet light over a predefined wavelength range according to a predefined spatial distribution of a spectral transmittance, the attenuating filter comprising:
   a substrate fabricated from a material transparent to ultraviolet light; and
   at least one filter coating applied to a surface of the substrate;
   the filter coating comprising at least one layer fabricated from a dielectric material that absorbs over a predefined wavelength range, wherein the thickness, measured perpendicular to the surface of the substrate, of the filter coating varies over the surface of the attenuating filter, thereby obtaining a spatial variation of the transmittance of the filter coating across the surface of the attenuating filter;
   and wherein the filter coating has a maximum thickness of less than 10 nm.

19. An attenuating filter comprising:
   a substrate fabricated from a transparent material; and
   at least one filter coating applied to a surface of the substrate;

the filter coating comprising at least one layer fabricated from a dielectric material that absorbs over a predefined wavelength range, wherein the dielectric material from which the layer of the filter coating is fabricated contains at least one metal oxide;

wherein a dielectric antireflection coating is arranged on the filter coating;

wherein the attenuating filter provides a prescribed attenuation of the intensity of transmitted ultraviolet light over a predefined wavelength range in the ultraviolet spectral region at wavelengths of less than 200 nm according to a predefined spatial distribution of a spectral transmittance; and wherein the filter coating has a maximum thickness of less than 10 nm.

20. An attenuating filter according to claim 19, wherein a thickness of the dielectric material is substantially uniform across the layer, thereby producing a uniform transmittance of the filter coating.

21. An attenuating filter according to claim 19, wherein the dielectric material from which the filter coating is fabricated has an absorption coefficient, k, that is greater than 0.5.

22. An attenuating filter according to claim 19, wherein the dielectric material contains tantalum oxide.

23. An attenuating filter according to claim 22, wherein the dielectric material consists essentially of tantalum oxide.

24. An attenuating filter according to claim 19, wherein the thickness of the filter coating varies over the surface of the attenuating filter, whereby a spatial variation of the transmittance of the filter coating across the surface of the attenuating filter is obtained.

25. An attenuating filter according to claim 24, wherein the thickness of the filter coating varies continuously over the surface of the attenuating filter.

26. An attenuating filter according to claim 19, wherein the antireflection coating has an essentially uniform thickness over the entire surface of the filter.

27. An attenuating filter according to claim 19, wherein the antireflection coating has several layers, each of which has an essentially uniform thickness.

28. An attenuating filter according to claim 19, wherein the antireflection coating has a multilayer stack fabricated from alternating layers of a dielectric material with a high refractive index and layers of a dielectric material with a low refractive index.

29. An attenuating filter according to claim 28, wherein one of the layers of the dielectric material with a high refractive index is applied directly to the filter coating.

30. An attenuating filter according to claim 29, wherein magnesium fluoride ($MgF_2$) is employed as the dielectric material with a low refractive index.

31. An attenuating filter according to claim 29, wherein aluminum oxide ($Al_2O_3$) is employed as the dielectric material with a high refractive index.

32. An attenuating filter according to claim 19, wherein an antireflection coating is applied to the surface of the substrate opposite to that surface on which the filter coating is applied.

33. An attenuating filter according to claim 19, wherein an antireflection coating is arranged between the substrate and the filter coating.

* * * * *